US008859872B2

(12) United States Patent
Williams (10) Patent No.: US 8,859,872 B2
(45) Date of Patent: Oct. 14, 2014

(54) METHOD FOR GIVING FEEDBACK ON A MUSICAL PERFORMANCE (71) Applicant: Spectral Efficiency Ltd., Grendon (GB)

(72) Inventor: Richard G. C. Williams, Grendon (GB)

(73) Assignee: Spectral Efficiency Ltd, Northhamptonshire (GB)

( * ) Notice: Subject to any disclaimer, the term of this patent is extended or adjusted under 35 U.S.C. 154(b) by 0 days.

(21) Appl. No.: 13/760,313

(22) Filed: Feb. 6, 2013

(65) Prior Publication Data

US 2013/0205975 A1    Aug. 15, 2013

(30) Foreign Application Priority Data

Feb. 14, 2012   (GB) .................................. 1202515.1

(51) Int. Cl.
*G09B 15/00* (2006.01)

(52) U.S. Cl.
CPC ...................... *G09B 15/00* (2013.01)
USPC ...................... 84/470 R; 84/477 R (58) Field of Classification Search
USPC ............................. 84/470 R, 477 R
See application file for complete search history.

(56) References Cited

U.S. PATENT DOCUMENTS

| 3,016,792 | A | * | 1/1962 | Payne .............................. 352/44 |
| 4,377,961 | A | | 3/1983 | Bode |
| 4,688,464 | A | | 8/1987 | Gibson et al. |
| 5,521,323 | A | | 5/1996 | Paulson et al. |
| 5,889,224 | A | * | 3/1999 | Tanaka ............................. 84/645 |
| 5,913,259 | A | | 6/1999 | Grubb et al. |
| 6,107,559 | A | * | 8/2000 | Weinstock et al. ............. 84/634 |
| 6,417,435 | B2 | * | 7/2002 | Chantzis et al. ............. 84/477 R |
| 7,323,629 | B2 | | 1/2008 | Somani et al. |
| 7,504,575 | B2 | * | 3/2009 | Schwartz ........................ 84/637 |
| 7,598,447 | B2 | | 10/2009 | Walker, II et al. |
| 7,919,706 | B2 | * | 4/2011 | Tsui et al. ........................ 84/618 |
| 7,935,880 | B2 | * | 5/2011 | Stoddard et al. ................ 84/609 |
| 7,973,230 | B2 | * | 7/2011 | Mahowald ...................... 84/609 |
| 7,982,114 | B2 | * | 7/2011 | Applewhite et al. ......... 84/477 R |
| 8,008,566 | B2 | | 8/2011 | Walker, II et al. |
| 8,076,564 | B2 | * | 12/2011 | Applewhite ............... 84/477 R |
| 8,294,016 | B2 | * | 10/2012 | Franzblau ....................... 84/609 |
| 2005/0262989 | A1 | * | 12/2005 | Franzblau ................... 84/470 R |
| 2008/0070203 | A1 | * | 3/2008 | Franzblau ...................... 434/157 |
| 2010/0233661 | A1 | * | 9/2010 | Franzblau ...................... 434/178 |
| 2013/0312587 | A1 | * | 11/2013 | Williams ........................ 84/465 |

OTHER PUBLICATIONS

Gerhard, D., "Pitch Extraction and Fundamental Frequency: History and Current Techniques", Technical Report TR-CS Jun. 2003, University of Regina, Saskatchewan, Canada, Nov. 2003.
Website entitled "Scales and Arpeggios with Confidence", located at www.saawithconfidence.com, last viewed Jun. 10, 2014.

* cited by examiner

*Primary Examiner* — Robert W Horn
(74) *Attorney, Agent, or Firm* — Thomas|Horstemeyer, LLP (57) ABSTRACT

A method is presented that allows feedback to be given on a musical performance without restrictions on the performance in terms of quality of intonation, tempo, or specific note order. Based on standard musical exercises, the ability to rate a performance is tolerant to repeated and/or omitted notes, to varying tempo and to systematic tuning errors. The method is suitable for use on mobile devices and may provide real-time feedback to allow the performer to adjust their performance or monitor their progress during the performance. Since a wide range of proficiency is able to be rated to give an indication of how well the performer executed a musical exercise this allows very inexperienced musicians to feel a sense of accomplishment when practicing outside the teaching environment as well as giving more accomplished musicians the feedback they need for continuous improvement.

36 Claims, 6 Drawing Sheets

METHOD FOR GIVING FEEDBACK ON A MUSICAL PERFORMANCE

CROSS-REFERENCE TO RELATED APPLICATION

This application claims priority to U.K. Provisional Application No. GB1202515.1, filed on Feb. 14, 2012, which is entirely incorporated herein by reference.

BACKGROUND OF THE INVENTION

1. Field of the Invention

This invention relates to the practice of creating music with a musical instrument or voice and to the feedback given to the performer, and, more particularly, to a method for giving feedback on the proficiency of a performance of standard musical exercises.

2. Description of the Background

It is important for a performer to be given feedback when trying to perfect the creation of music in order to understand which aspects of the performance should be altered in order to improve the performance. In most cases this feedback is only given by the teacher during lessons and at all other times the performer must provide their own feedback. This requires both discipline and skill which are not always present. In order to overcome this several devices are available. One approach is to record the desired performance so the performer can compare their own performance with the desired performance by playing the desired performance and listening to their own performance to compare and contrast the two or by trying to play along with the desired performance. Another approach is to use a system where the musician's performance is captured and compared to a stored desired performance and feedback is given to the performer on the goodness of the match. Both of these approaches have disadvantages. A disadvantage of the first approach of relying on the performer to compare their performance to a prerecorded performance is that it is difficult for the performer to compare their performance objectively to the desired performance. The accuracy of the comparison is likely to be less stringent by the musician that has less experience and therefore needs more accurate feedback. A disadvantage of the second approach is that the performer is constrained to perform sufficiently closely to the stored desired performance in order for the feedback to be meaningful. A significant amount of practice must already have been completed to attain this level of competence. For more complicated musical compositions it is prohibitively difficult to compare a performance below a certain standard to the desired performance due to the lack of correlation between the captured performance and the desired performance to which it is compared. U.S. Pat. No. 5,521,323, issued May 28, 1996, to Paulson et al., U.S. Pat. No. 5,913,259, issued Jun. 15, 1999 to Grubb et al. and U.S. Pat. No. 7,323,629, issued Jan. 29, 2008 to Somani et al. all describe methods for matching a performance to a stored musical score and giving feedback to the performer on the match between their performance and the stored score. All require a high amount of correlation in the captured performance for them to be effective and feedback can only be given against the stored desired performance.

However this limitation is able to be relaxed when standard musical exercises such as scales and arpeggios are considered. The ability to accurately perform musical exercises is fundamental to the creation of music and the importance of such exercises is recognized by bodies that award certificates for musical competence, such as The Associated Board of the Royal Schools of Music (ABRSM), by the inclusion of such exercises in their practical examinations. It is therefore acknowledged to be advantageous for improving musical proficiency to be able to perform standard musical exercises as well as to be able to perform prescribed musical compositions. Due to this the incentive to help performers improve their execution of these exercises has led to the introduction of products operating on the principles mentioned above. For example, Yvonne Behar has a web site called 'Scales and Arpeggios with Confidence'™, www.saawithconfidence.com, where she sells CDs that demonstrate the desired performance of these exercises on the piano along with recorded comments on technique. Similarly, a company called Makemusic® Inc sells a product called Smartmusic® that compares a captured performance with a desired performance and gives feedback. Both of these products suffer from the disadvantages outlined above. U.S. Pat. No. 6,417,435, issued Jul. 9, 2002, to Chantzis et al describes a device for testing the audio-acoustic proficiency of a performer performing standard musical exercises. However this device also has the limitation that the performer must choose aspects of the exercise, such as a targeted tempo, so that the device can choose a desired performance against which to compare the execution of the musical exercise. As in the other examples, the performance must be close to the chosen exercise parameters to ensure meaningful feedback.

There are also devices offered that allow a performer to check specific aspects of their performance such as intonation. U.S. Pat. No. 7,504,575, issued Mar. 17, 2009, to Schwartz describes a device capable of training a musician to improve their intonation by giving them feedback on the frequency of the note being produced. Similarly an application called Tartini produced by Philip McLeod et al. at the University of Otago, www.tartini.net, gives feedback on intonation by displaying the frequency contours of the sound being produced by the performer. While neither system requires a stored composition to give the feedback in both of these cases the performer is required to drive the training themselves in that they must deliberately solicit feedback from the training system on a particular aspect that they wish to improve. Similarly, the aforementioned U.S. Pat. No. 7,323,629, issued Jan. 29, 2008 to Somani et al. has a mode where it uses the techniques used to analyze and compare a received input to a desired performance to merely display what is being received. However, Somani et al. only teaches how to provide feedback to the performer when the performance is compared to a stored desired performance. In the mode where the input is merely displayed the performer is required to drive the training themselves.

What is needed is a system that offers feedback to the performer on their performance of a standard musical exercise without the need to compare the performance to a stored desired performance. The performer is then able to perform a standard musical exercise and receive objective feedback without understanding the particular aspect of their performance that they need to improve and without having to perform the musical exercise to a high level of competence in order to solicit meaningful feedback.

SUMMARY OF THE INVENTION

The present invention is a method to provide objective feedback to a performer on the proficiency with which they execute a standard musical exercise without any restrictions being placed on the performance. The method includes steps to determine the exercise being performed; to measure critical aspects of the performance such as intonation, tempo, accuracy of the notes and articulation; to allow repetition and/or omission of notes; to allow greatly varying tempo during the exercise; to allow a rating of the proficiency with which the exercise is performed and to allow a record of progress to be presented to the performer.

An inexperienced musician will often perform standard musical exercises imprecisely. The most common imperfections are retracing parts of the exercise that were poorly performed initially and slowing or pausing in places where the performer is unsure while speeding up where the performer is more confident. These tempo changes can be quite dramatic leading to a variation in the tempo during an exercise of at least a factor of 2 making the slower parts less than half the speed of the faster parts. The present invention has the advantage that the performance does not need to be compared to a stored version of the desired performance and so allows even poor performances to be rated. Therefore the performer can be musically inexperienced without an understanding of which aspects of their performance need to be improved since the method is able to present feedback on all the basic aspects of the musical performance due to the nature of standard musical exercises. The feedback continues to be useful as the proficiency of the performer improves and as the performer gains more experience due to the measurements being objective thus allowing the feedback to quantify even small levels of imperfection. The method also has the advantage that it can be implemented efficiently enough for real-time feedback to be available on a handheld device such as a Smartphone.

BRIEF DESCRIPTION OF THE DRAWINGS

An example of the invention will now be described by referring to the accompanying drawings in which.

DETAILED DESCRIPTION OF THE PREFERRED EMBODIMENT

It is to be understood that the figures and descriptions of the present invention have been simplified to illustrate elements that are relevant for a clear understanding of the present invention, while eliminating, for purposes of clarity, other elements found in a typical system for extraction and display of musical information. Those of ordinary skill in the art will recognize that other elements are desirable and/or required to implement the present invention. However, because such elements are well known in the art, and because they do not facilitate a better understanding of the present invention, a discussion of such elements is not provided herein.

Figure 1:
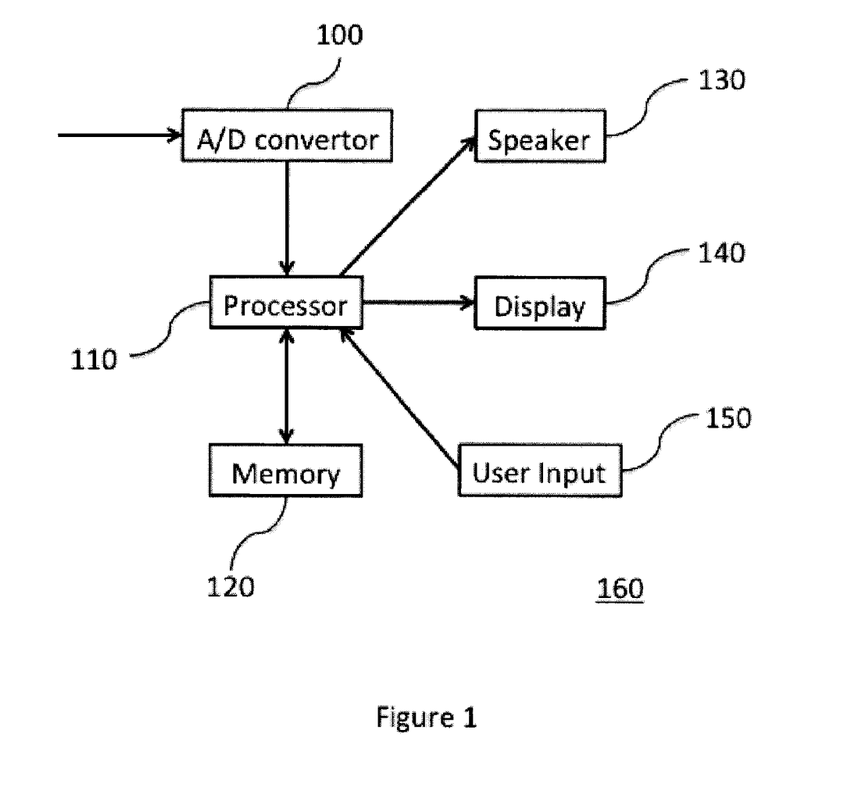
FIG. 1 illustrates a system diagram of a device capable of being used to implement the current invention.

FIG. 1 illustrates a system diagram of a device capable of being used to implement the present invention. The input to 100 is an analog signal, produced by the performer, from an internal or external microphone that is then sampled by an analog-to-digital convertor at a suitable sampling rate. The human ear can detect frequencies up to about 20 KHz and so a sampling rate of more than twice this is desirable. A standard sampling rate is 44.1 KHz but several other frequencies are also commonly used in audio systems. The digital samples from 100 are passed to a processor 110 where audio queuing tasks are typically performed. If digital samples of the performance are available from another system or from a previous recording then these can be used directly by processor 110 without the need for the A/D convertor 100 without departing from the scope of the present invention. In the preferred embodiment of the present invention the processing steps to extract the necessary information from the input samples will also be carried out on this processor although it is clear that separate tasks could be done on separate processors if desired. The processor is typically capable of storing the input samples in memory 120 for later playback through an internal or external speaker or headphone 130 as well as storing information extracted by the processing tasks to be described below. The memory 120 could be any storage medium such a random access memory (RAM), read-only memory (ROM), magnetic hard disk or CD-ROM. The incoming samples may be sent out as soon as they are received although this is not the preferred embodiment of the present invention. The samples are processed and the result is displayed as feedback to the user on a display 140. It would also be possible for the feedback to be sent to another device either as well as or instead of displaying it on 140. It is desirable that some real-time feedback is given to the performer during the recording of the performance. In the preferred embodiment this feedback would be the current note being received along with any intonation error that is detected. As well as showing that the system is working, this allows the performer to adjust their performance while they are performing to attain a higher rating. The processing may be directed by user input received from an input device 150 which could be a touch screen or a keyboard or a voice recognition system or a combination of devices. Typical user inputs would direct the system to start recording, to playback a previous recording and to set the pitch of the instrument such a B flat for a common type of clarinet or E flat for a common type of cornet or C (concert pitch) for a violin with standard tuning. In the preferred embodiment the user input is from a touch screen and includes an indication of the pitch of the instrument and direction to start and stop recording and/or playback. If a record of previous ratings is to be retrieved it may be necessary to identify the performer. Similarly, if the rating is to be altered depending on the proficiency of the performer then the proficiency of the performer must be known. Other commands to alter the information displayed as part of the feedback on a performance or expose details of the feedback or to browse history of previous feedback will also be entered through 150 in a manner with which anyone who has used a Smartphone will be familiar. Default processing settings may be used so that the method can provide feedback in the absence of user input. For example, it is clear that it could be possible to dedicate the device to this task so that as soon as a signal is present at 100 the processor executes the present invention and gives the relevant feedback. However, the preferred embodiment is that the present invention would share a device that is also used for several other tasks and will only perform this task when instructed to do so. All the components shown in FIG. 1 form a system 160. In the preferred embodiment of the present invention 160 is a single mobile device such as a Smartphone or computing tablet.

Figure 2:
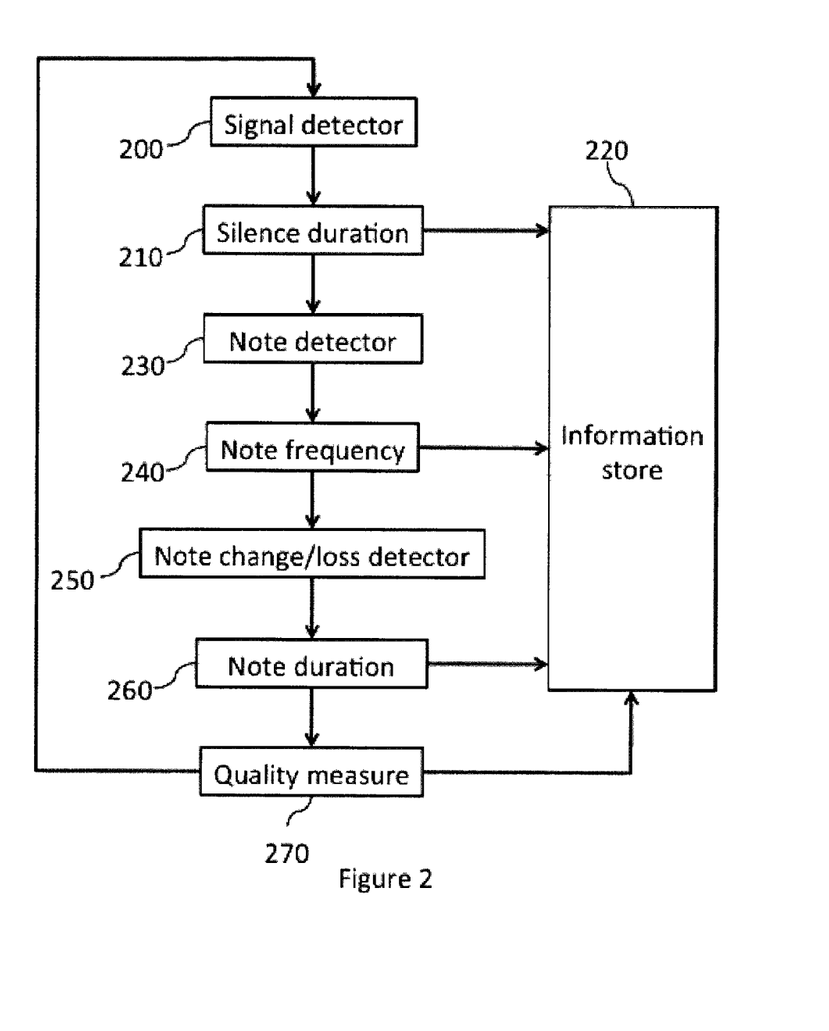
FIG. 2 is a flow diagram incorporating the elements used to extract basic musical information from the input signal.

FIG. 2 gives a flow diagram of the processing steps used to extract the information from the input signal that will be used to form the feedback to the user. The input samples are compared to an energy threshold by the signal detector 200 to determine if a signal is present. The energy in the signal can be calculated by a variety of methods. For example, the squared value of each sample can be filtered by a low pass filter with a Butterworth response using a cut-off frequency of about 35 Hz and the resulting filter output compared to an energy threshold. The presence or absence of a signal with sufficient energy can be determined by testing against the same threshold or some hysteresis may be used where a different threshold is used to detect the onset of energy than the threshold used to detect the loss of energy. Alternatively a simple threshold detector can be used that indicates a signal is present when a predetermined number of samples in the incoming signal are above a certain threshold or that indicates a signal of sufficient energy is not present when a predetermined number of samples in the incoming signal are below a certain threshold. The choice of signal detector will usually be driven by the choice of frequency detection in 230. U.S. Pat. No. 4,688,464, issued on Aug. 25, 1987, to Gibson et al. uses zero crossings and a signal threshold to determine the frequency of a periodic signal. If this scheme is used in 230 then it is advantageous to use a simple threshold detector to indicate the presence or absence of a signal of sufficient energy using the same threshold value as that chosen for the zero crossing analysis. When a signal is detected a value for the duration of silence (or more precisely the absence of a prerequisite amount of signal energy) is calculated by 210 and the value is stored in the information store 220. 210 may take as input the end of the last signal seen, the start of the signal just detected, the number of samples between those events and the sampling rate of the signal. Using this information the duration of silence is calculated and stored in 220. The preferred calculation that gives a duration in seconds is ('sample number where energy last rose above the threshold'–'sample number where energy last fell below the threshold')/'samples per second'. Other methods could be used such as a timer, possibly asynchronous and unrelated to the sampling rate, which is polled as the signal detection events are seen. The essential point is that the duration for which there was an absence of sufficient signal energy is noted for use in the feedback to the user. Once a signal is detected the note detector 230 is used to determine if a valid note is present in the signal. There are many methods for doing this. In general a method for determining the frequency is employed and the output is checked for stability. An overview of methods for frequency extraction is given by D. Gerhard in "Pitch extraction and fundamental frequency: History and current techniques", Technical Report TR-CS 2003-06, University of Regina, Saskatchewan, Canada, 2003. As can be seen there are many techniques available. In U.S. Pat. No. 4,377,961, issued on Mar. 29, 1983, to Bode half-wave rectifiers are described as a hardware solution. In U.S. Pat. No. 7,598,447, issued on Oct. 6, 2009, and in U.S. Pat. No. 8,008,566, issued on Aug. 30, 2011, both to Walker, II et al. a sophisticated use of frequency and time domain techniques is used to extract frequency information from polyphonic signals. For the present invention the aforementioned technique by Gibson is adequate and has the advantage of both simplicity and speed of frequency determination. It is to be understood that any frequency detection technique may be employed in 230 without departing from the scope of the present invention. When a note has been qualified and declared stable in the signal the frequency associated with that note is stored in 240 as well as information about the time that it took to be qualified after the signal detection in 200. The signal is then monitored by the note change/loss detector 250 for a change in frequency or a loss of signal energy. This can be accomplished by continually running the note detector algorithm in 230 and the signal detector algorithm in 200. If the output of either of these algorithms changes then a note change/loss has been detected. Some tolerance on the amount of change in the output that is needed before a note change/loss is declared is usually used to ensure that minor glitches in the note do not trigger a note change/loss detection. However, the indication of such glitches may be used in the determination of the quality of the note. It is also sufficient, and simpler, to keep track of the frequency that has been determined to ensure that the signal still aligns to it. This can be achieved by monitoring the zero crossing positions or the zero crossing rate and ensuring that it coincides with the expected positions or rate within a predetermined tolerance. When the alignment is determined to be lost the duration for which the note was present is determined by 260 and stored in the information store 220. The method for determination of the note duration in the preferred embodiment is similar to that used for the determination of the silence duration in 210 although a different method may be employed in 210 and 260 without departing from the scope of the present invention. Optionally, a quality measure of the note is determined by 270 and this measure is also stored in 220. The quality measure can be very basic, such as measuring the amount of jitter seen while tracking the note's frequency, or it can be more complicated, such as monitoring the change in energy contained in frequency bins output from a frequency domain transform that is run periodically during the time the note is present. The quality information, if present, may be used as part of the feedback to the user or as more detailed information available to the user if requested. The feedback given to the user by way of this quality information can be as simple as how well sustained the note was or it can be more precise information concerning how the timbre of the note changed. It is possible to determine the quality of the tonguing of a wind instrument or the bowing of a string instrument but the algorithms to do so are outside the scope of the present invention. There is a wealth of literature available that detail techniques to extract information from musical signals and many of these could be employed in the quality measure. A good overview of techniques accompanied by an extensive reference list is given by A. Klapuri and M. Davy in the book "Signal Processing Methods For Music Transcription" published by Springer in 2006. A more recent set of papers on the same area of investigation is found in the October 2011 volume of the IEEE Journal of Selected Topics in Signal Processing. After the optional quality information and the note duration information have been stored in 220 the process returns to 200. In the case of a slurred passage of music or in the case of a shifting frequency or timbre there may well be signal present already in which case the detector 200 will preferably detect the signal instantly, the silence duration measured by 210 will preferably be zero and the note detector will preferably begin to reacquire the new frequency at once. It will be clear to those of ordinary skill in the art that the processes outlined above need not run in series as illustrated in FIG. 2 but may be run in parallel. The only requirement for the preferred embodiment of the present invention is that information about the duration and frequency of notes and the durations of the signal absences are recorded in the information store 220 for use as feedback to the user. This information is sufficient to give feedback to the user on intonation, tempo and articulation. Information on intonation may be derived from the frequency measured for each note. The closer the received frequency is to an ideal note the better the intonation. Information on tempo may be derived from the amount of time spent on each note and the separation between the notes. The speed of transition between notes is the tempo and the absolute value of this for any given passage of the musical exercise as well as any variations in the tempo throughout the musical exercise are easily found from the duration information. Information on articulation may be derived from the separation between notes as well as from the amount of time taken for each note to stabilize. A slurred musical exercise should have no loss of signal energy between notes and brief transition times from one note to the next. A tongued note or a note where the direction of a bow is changed will have a period of low signal energy between notes. Other common bowing patterns will exhibit a mixture of these cases.

Figure 3:
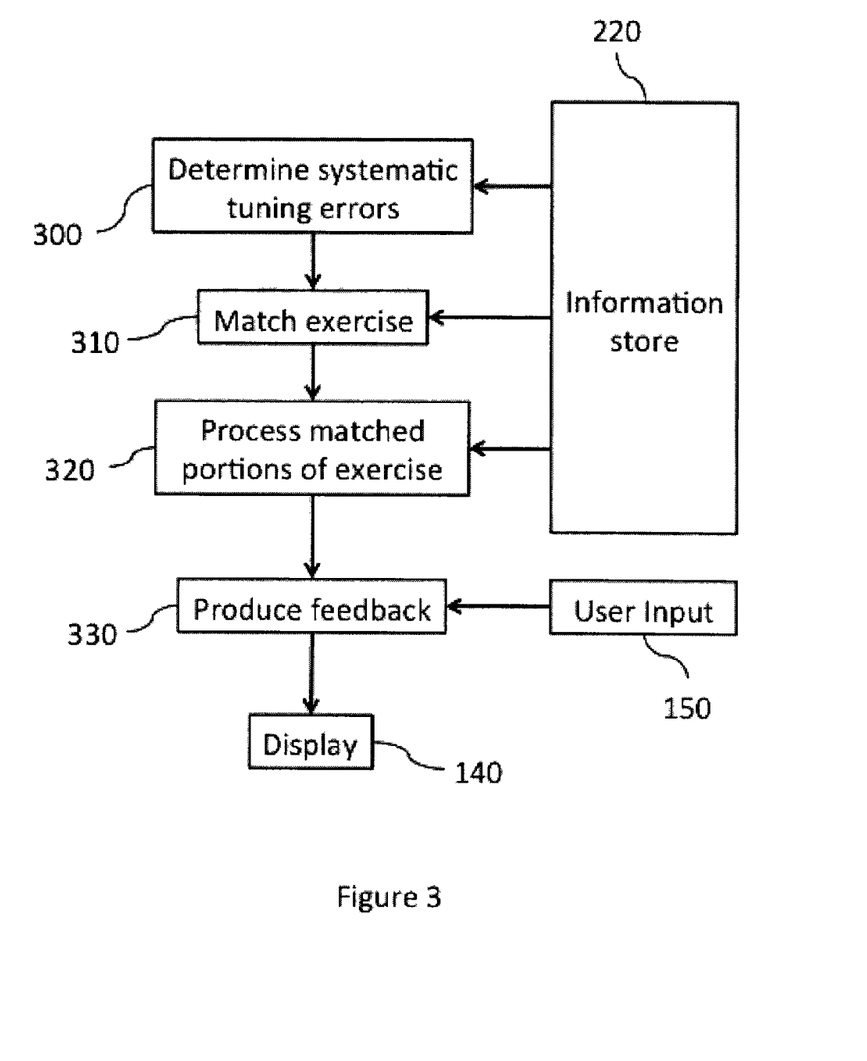
FIG. 3 illustrates the post-processing functions used for creating the feedback for the performer in an embodiment of the present invention.

FIG. 3 illustrates the steps taken to produce feedback for the user from the information stored in 220. The frequency of each qualified note is processed by 300 to determine if there are any systematic tuning errors. 300 compares the measured frequencies to the ideal frequencies of musical notes and determines the errors. The frequencies of ideal notes are normally based on the frequency of the A above middle C. This is conventionally 440 Hz but it can vary. The value used may be assumed to be 440 Hz or this may be part of the user input 150. Given the frequency of this note, $F_A$ Hz, the frequency of each ideal note in an equal tempered Western scale is $F_A * 2^{n/12}$ Hz where n is the number of semi-tones above, denoted by a positive n, or below, denoted by a negative n, the reference A note. The tuning error, $E_R$, is given as the logarithm base 2 of the ratio of the received frequency, $F_R$ Hz, to the frequency of the closest ideal note, $F_V$ Hz, normalized so the value 100 represents a semi-tone interval. As a formula this can be expressed as:

$$E_R = 100 * 12 * LOG_2(F_R/F_V)$$

and is normally referred to as the number of cents by which a note is in error where a cent is one hundredth of a semi-tone. Since all the notes are separated by 100 cents from their neighbours the closest note to any frequency results in an error value in a range of [−50, 50) cents where the closed and open ends of the range are an arbitrary choice made by the implementer. That is the range (−50, 50] would be equally valid and depends on the implementation. The errors are averaged to see if there is a systematic bias in the measured frequencies away from the frequencies of ideal notes. Such a bias may be introduced by a poorly tuned instrument. In the case of a wind or brass instrument the same bias will apply to all notes and so may be determined by averaging all of the errors. In the case of a stringed instrument the same bias will apply to all notes produced by the same string. To determine systematic tuning errors in this case the notes that can be produced by the same string are averaged together to determine any bias. Which notes these are will depend on the instrument and the chosen tuning of that instrument which may be non-standard. For instance a violin normally has its strings tuned to G, D, A and E. This information may be entered as part of the user input, 150, or may be determined algorithmically by using a search algorithm on the errors and frequencies of the notes to discover a bias. If a collection of notes that could come from the same string is found to have a bias then that bias would be accounted for only on that collection of notes. For instruments such as a piano or harp where individual notes are tuned it is only possible to detect bias in the tuning by comparing several instances of the same note. In the example of the method being described there would not be enough information to make a meaningful determination but history of performances could be kept and used for such a determination if desired. The preferred embodiment of the invention averages all errors of the notes of a single performance to determine a single bias. This is sufficient for wind and brass instruments and is also sufficient for a stringed instrument where the relative tuning of each string is correct even though the absolute tuning of all the strings may have a bias. The averaging process determines a value that ensures that all of the frequency errors are within the range [−50, 50) cents from the average. Each received frequency is compared to the frequency of the nearest ideal note and the error calculated using the formula above. A simple average of these errors is produced, $\overline{E_R}$, by summing the errors and dividing by the number of errors. The closest ideal note chosen for each frequency is then varied up or down by a semi-tone, or equivalently the associated error $E_R$ is changed by −100 or +100 cents respectively, if it is outside the range [−50, 50) cents from $\overline{E_R}$. Any changes will result in a change in $\overline{E_R}$ so this process is repeated until all the errors are within the range [−50, 50) of the newly calculated simple average, $\overline{E_R}$. For example, consider the following set of received frequencies (all measured in Hz):

[227.3, 269.4, 337.2, 448.7, 536.1, 450.3, 535.7, 682.4, 898.0, 678.3, 540.2, 452.8, 336.2, 536.1, 453.6, 358.1, 337.2, 285.1, 227.8].

The nearest ideal frequencies, assuming $F_A$=440 Hz, are found to be (to one decimal place):

[233.1, 277.2, 329.6, 440.0, 523.3, 440.0, 523.3, 698.5, 880.0, 659.3, 554.4, 440.0, 329.6, 523.3, 466.2, 349.2, 329.6, 277.2, 233.1].

The errors given in cents are calculated as (to one decimal place):

[−43.5, −49.3, 39.3, 33.9, 42.0, 40.1, 40.7, −40.3, 35.1, 49.3, −44.8, 49.6, 34.2, 42.0, −47.3, 43.4, 39.3, 48.8, −39.7].

These errors have an average value of 14.4 cents. Any error that is lower than −35.6 is too far from the average value and the choice of note needs to decrease by a semi-tone. Changing these notes results in the set of errors:

[56.5, 50.7, 39.3, 33.9, 42.0, 40.1, 40.7, 59.7, 35.1, 49.3, 55.2, 49.6, 34.2, 42.0, 52.7, 43.4, 39.3, 48.8, 60.3].

The new set of errors has an average value of 45.9 cents and all the values are now within [−50, 50) cents of the average. The systematic tuning bias of this example set of frequencies is declared to be 45.9 cents. When all the received frequencies are adjusted for the bias the final set of ideal notes chosen by the algorithm will be the set of closest ideal notes which is what is required. In the preferred embodiment any systematic tuning bias does not detract from the rating of the overall proficiency of the performance.

The musical exercise that is being performed is determined by finding the closest standard musical exercise to the received notes using the process 310. This matching can be performed using the original measured frequencies or using the frequencies resulting from adjusting the measured frequencies for any systematic tuning errors that have been found. If a single systematic tuning error has been found, as in the example above, then either the original frequencies or the adjusted frequencies will give the same result. If several systematic tuning errors have been found then the result will differ depending on whether the original frequency values or the adjusted frequency values are used and the matching process is more accurate if it is carried out using the adjusted frequency values. Standard musical exercises include major scales, minor scales (harmonic, melodic, natural), chromatic scales, major arpeggios, minor arpeggios, whole tone scales, dominant $7^{th}$ progressions, diminished $7^{th}$ progressions and many others. The preferred embodiment as illustrated in FIG. 3 will determine which musical exercise is being performed in 310 although it is to be understood that this information could be provided by the user through the user input 150 without departing from the scope of the present invention. The method used to determine the musical exercise performed is as follows. Two assumptions can be made that help with the identification. 1. The exercise starts on the correct note (after adjustment for any tuning bias). 2. The exercise spans a whole number of octaves meaning that the frequency of the note with the highest frequency should be approximately a power of 2 times the frequency of the first note. Taking these assumptions into account the determination of the exercise begins with the frequency of the first note and the highest frequency of all the notes and determines how many octaves the musical exercise spans. The frequency difference between each pair of consecutive notes is used to identify portions of the sequence of notes that are increasing or decreasing monotonically. The increasing and decreasing portions are spliced together by finding common notes and joining the portions by overlapping these notes. This usually forms a continuous sequence of increasing notes from the first note up to the note with the highest frequency and a continuous sequence of decreasing notes down from the note with the highest frequency to the final note. In some musical exercises there are both increasing and decreasing portions between each end note and the note with the highest frequency. An example of such a musical exercise is a scale in thirds. If this class of musical exercise is to be accounted for in an embodiment of the present invention then extra logic is necessary. It will be obvious to those skilled in the art how to design this logic having reviewed the description presented here. However, an embodiment of the present invention does not need to include this class of musical exercise to be valuable. The number of distinct note values measured between, and potentially including, the starting note and the final note and the number of octaves separating the first note and the note with the highest frequency are used to identify potential candidates for the exercise being performed. In the following examples the first and last notes are included in the distinct note count. For instance 29 distinct notes over a 2 octave range with 14 notes on either side of the highest frequency note should be from either a major or minor scale whereas, 13 distinct notes over a 2 octave range with 6 notes on either side of the highest frequency note should be from either a major or minor arpeggio and 25 distinct notes over a 3 octave range with 12 notes on either side of the highest frequency note should be from a dominant $7^{th}$ scale or a diminished $7^{th}$ scale. Some styles of musical exercise include the highest frequency note twice and the algorithms used should be aware of this. If two distinct notes of a similar enough frequency are adjacent and close to the middle of the set of measured frequencies then this style of musical exercise should be considered. If the number of notes is not equal to a candidate musical exercise then the musical exercise or exercises with the nearest number of notes are considered. Similarly, if the number of notes ascending and the number of notes descending are different then musical exercises corresponding to both of these numbers should be considered. The interval between each pair of consecutive notes is then calculated in cents using the formula given above for determination of the tuning error of each note. The sequence of notes is then compared to the candidate musical exercises by summing the difference between the measured intervals and the ideal intervals of each candidate musical exercise. The closest candidate musical exercise is the one that produces the lowest value for this sum of differences. For instance, the ascending portion of a single octave of a major scale has the ideal sequence of intervals, measured in cents, of [200, 200, 100, 200, 200, 200, 100]. The corresponding ideal sequence of intervals in a harmonic minor scale is [200, 100, 200, 200, 100, 300, 100]. The ideal set of intervals that has the least summed difference to the measured set of intervals is chosen as the musical exercise that has been performed.

Clearly in this example there are intervals that the two scales share and so the difference between those and the measured intervals will not affect the result. This could be taken into account in the process for determining the exercise. Indeed there are many algorithms that could be used to determine the exercise being performed and it is to be understood that the exact algorithm used does not affect the scope of the present invention. However the algorithm presented in the example below is the preferred embodiment because its implementation is flexible to the addition of different standard musical exercises and it is robust. Where the number of distinct notes, and therefore the number of measured intervals, does not correspond to a standard musical exercise the comparison uses a set of intervals that is a combination of the ideal or measured intervals. In the case where there are more measured intervals than ideal intervals, measured intervals are combined in such a way to minimize the sum of differences. In the case where there are less measured intervals than ideal intervals, indicating the omission of at least one note, ideal intervals are combined in such a way to minimize the sum of differences.

Figure 4:
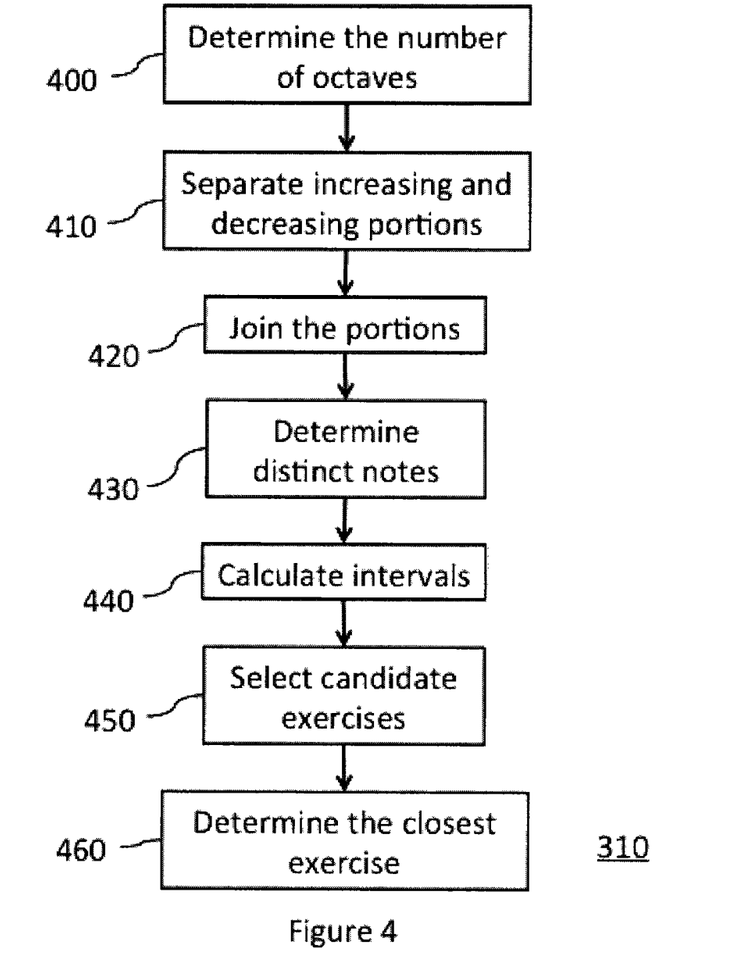
FIG. 4 illustrates the steps taken to identify the musical exercise being performed in an embodiment of the present invention.

FIG. 4 illustrates the steps in 310 described above. Here we show how each step is accomplished with the example set of measured intervals introduced above. This is an example of the determination of the musical exercise in 310. It is to be understood that there are many ways to determine the musical exercise and this example is provided merely to add clarity to the description of the present invention, and it is to be understood that other embodiments may be utilized and that changes may be made without departing from the scope of the present invention. The first qualified note is used as the beginning of the determination of the exercise being performed. The note with the highest frequency is identified. In the example the first note has a frequency of 227.3 Hz and the note with the highest frequency has a frequency of 898.0 Hz. These frequencies are used in 400 to determine the number of octaves present. The interval between the two frequencies is 2378.5 cents which is closest to 2400 cents, the interval equivalent to 2 octaves. In general the number of octaves is the closest integer to the interval in cents divided by 1200, the number of cents in an octave. Next the frequencies are separated into portions that are monotonically increasing up to the note with the highest frequency and portions that are monotonically decreasing down from the note with the highest frequency by 410. The portions in this example that are monotonically increasing are:

[227.3, 269.4, 337.2, 448.7, 536.1] and [450.3, 535.7, 682.4, 898.0].

The portions in this example that are monotonically decreasing are:

[898.0, 678.3, 540.2, 452.8, 336.2] and [536.1, 453.6, 358.1, 337.2, 285.1, 227.8].

These portions are then joined into a single sequence by 420. The notes in each portion are compared to the notes in the other portions to find notes that are close. The definition of close is an implementation parameter since it is used to choose between whether a note was played twice or the intonation of different notes was such that it appeared that the same note was played twice. Declaring measured frequencies that are within 25 cents of each other to be the same note works well. Frequencies that are identified as the same note are included in a new sequence just once. An average frequency may be used to represent the frequency of the collated frequencies. Other methods may also be used such as determining a new frequency from an average of the interval differences in cents or just choosing the minimum, maximum or median frequency. Any such methods may be utilized without departing from the scope of the present invention. After this collation of similar frequencies the remaining sequence in our example is:

[227.3, 269.4, 337.2, 449.5, 535.9, 682.4, 898.0, 678.3, 538.2, 453.2, 358.1, 336.7, 285.1, 227.8], where the frequencies in bold italics are created from the frequencies that have been declared similar and collated with the collated frequency being represented by a simple average of the original frequencies. The number of distinct notes found by 430 is simply the number of frequencies in the resulting sequence. In this example it is 14. The interval between each pair of consecutive frequencies is then calculated in cents using the formula given above for the determination of the tuning error of each note and, in the preferred embodiment, the accumulated interval is kept. In this example the accumulated intervals are:

[294.2, 682.8, 1180.5, 1484.8, 1903.2, 2378.5, 1892.8, 1492.1, 1194.7, 786.9, 680.2, 392.2, 3.8].

It should be understood that there are many ways of determining the set of values above. Rather than accumulating the individual intervals the interval from each frequency to the frequency of the first note could be used. It is also possible to use the set of intervals without accumulation and compare them to the intervals of a standard musical exercise in a future step. It is possible to use the frequency of the last note or the frequency of the note with the highest frequency as the reference point rather than use the frequency of the first note. Any such methods may be utilized without departing from the scope of the present invention. Next the candidate musical exercises are selected in 450. In the example there are 2 octaves containing 14 notes. This does not match any standard musical exercise exactly so the closest exercises are chosen. A major arpeggio over 2 octaves and a minor arpeggio over 2 octaves both contain 13 notes and so these are used for the comparison. To determine which of these standard musical exercises is the closest to the received frequencies 460 compares the accumulated measured intervals with the accumulated ideal intervals for each candidate exercise. The accumulated ideal intervals in a major arpeggio over 2 octaves are: [400, 700, 1200, 1600, 1900, 2400, 1900, 1600, 1200, 700, 400, 0].

The accumulated ideal intervals in a minor arpeggio over 2 octaves are:

[300, 700, 1200, 1500, 1900, 2400, 1900, 1500, 1200, 700, 300, 0].

Since we have more measured intervals in our example than ideal intervals we will need to combine at least 2 of the measured intervals together to find a match to the exercise. We add the absolute values of the difference between each measured interval and the corresponding ideal interval. For each interval we look to see if skipping an interval in the set of measured intervals will give a smaller result. This ensures that incorrect notes are found but not counted towards the matching of the musical exercise. For each interval we also look to see if skipping an interval in the set of ideal intervals will give a smaller result. This ensures that omitted notes are found but not counted towards the matching of the musical exercise. In the example it is found that when we compare the measured value 786.9 to the ideal value 700 and then compare the measured value 680.2 to the ideal value 700 the result reduces. Since the result is smaller with the measured value of 680.2 we skip the measured value of 786.9 and eliminate it from the matching process. In all other cases skipping a measured or ideal interval increases the result. The final results of accumulated absolute differences in the example are:

Major arpeggio, 434.2; and
Minor arpeggio, 218.6.

Thus, in this example, 460 declares a minor arpeggio over 2 octaves to be the closest standard musical exercise.

It is understood that the example above is intended to clarify the process used in the preferred embodiment of the present invention. There are alternative ways of achieving the same or substantially similar result. The order of the steps is not always critical to the result, the individual calculations used to achieve each intermediate result may be altered to equivalent or substantially similar calculations, with appropriate changes the period of the measured notes could be used rather than the frequency, more or less intermediate results are possible without affecting the overall outcome of the process 310, and it is to be understood that other embodiments may be utilized and that changes may be made without departing from the scope of the present invention.

The matched portions of the standard musical exercise in the example are therefore seen to be the frequencies:
[227.3, 269.4, 337.2, 449.5, 535.9, 682.4, 898.0, 678.3, 538.2, 453.2, 336.7, 285.1, 227.8].

Process 310 in this example used the measured frequencies without removing the systematic tuning error that was calculated earlier. Because this bias was a single bias that was the same for all notes the result is equivalent. If there are different biases applied to individual notes or collections of notes then these biases should ideally be removed before the process 310. After removing the 45.9 cent bias that was found for this set of example measured frequencies by 300 the resulting frequencies that correspond to the musical exercise in the example are:
[221.3, 262.3, 328.4, 437.7, 521.9, 664.5, 874.5, 660.5, 524.1, 441.3, 327.9, 277.6, 221.8].

In the example we determined the musical exercise being performed in steps 450 and 460. As mentioned earlier, it is possible that the musical exercise is provided as a user input. In this case it is not necessary to select a candidate musical exercise nor is it necessary to match the closest musical exercise. However, it is still necessary to associate measured frequencies with the given musical exercise to enable feedback to be given on the performance. In the case where a minor arpeggio had been specified as the musical exercise the process 310 detailed above would have determined the same set of associated measured frequencies:
[221.3, 262.3, 328.4, 437.7, 521.9, 664.5, 874.5, 660.5, 524.1, 441.3, 327.9, 277.6, 221.8].

The final set of frequencies as well as the original input is used by 330 to produce feedback for the user. The standard musical exercise in the example was found to be a minor arpeggio over 2 octaves and the closest ideal note to the first note, given $F_A$ is 440 Hz and accounting for the systematic tuning error, is an A at 220 Hz. Assume for the purposes of clarification that in this example the user has given the information through the user input 150 that the pitch of their instrument is B flat in which case the display back to the user must be adjusted from the concert pitch result above to a result corresponding to a B flat pitched instrument. The standard musical exercise performed here is therefore declared to be B minor arpeggio over 2 octaves. It can be seen that some or all of the preceding calculations could have been done after accounting for this shift in pitch by adjusting $F_A$ to be $440*2^{-2/12}$ Hz without departing from the scope of the present invention. Finally the feedback to the user is displayed on display 140. The feedback takes into account the standard musical exercise that was performed and may also feature intonation, tempo, articulation and tone quality. The extent and detail of the feedback may change and it is to be understood that any embodiment that expands or limits the feedback based on the standard musical exercise that has been determined in 460 does not depart from the scope of the present invention. The preferred embodiment produces at least intonation and tempo feedback. Feedback on intonation is provided using the error values and bias value or values that have been calculated in 300 and the tempo information is provided using the note and silence duration values that have been determined in 260 and 210 respectively.

Figure 5:
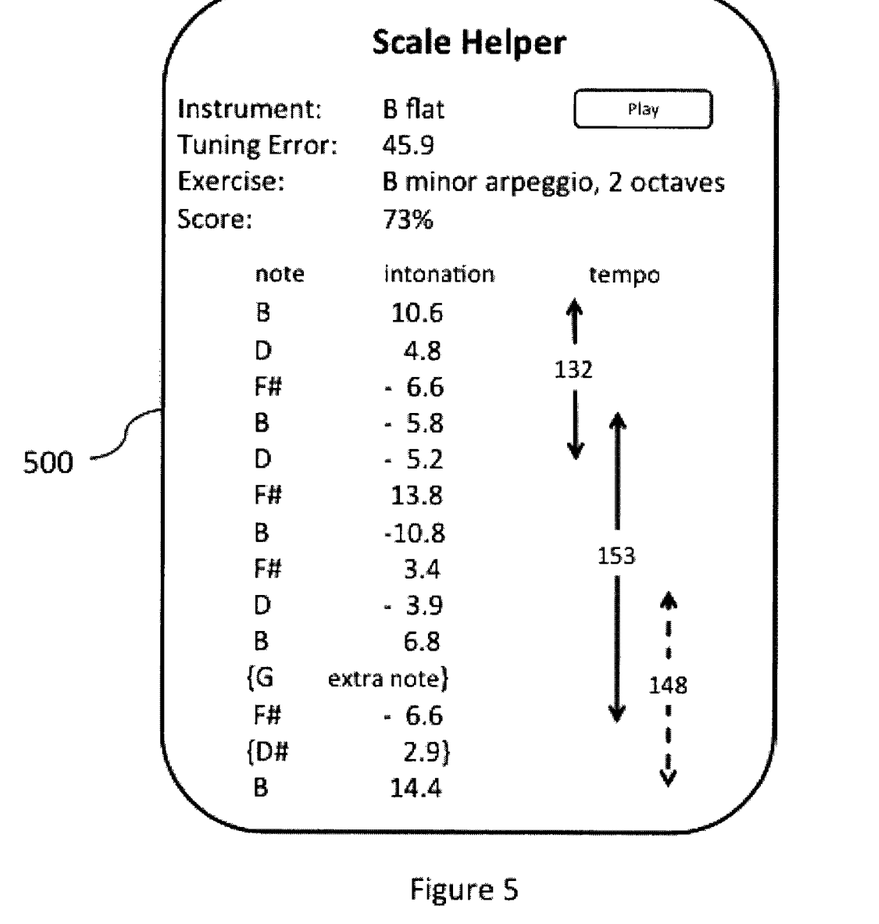
FIG. 5 illustrates an exemplary output of the feedback to the user.

An illustration of feedback that may be presented to the user is shown in FIG. 5 using the example above. The illustration 500 is of a screen from a typical Smartphone display where a Smartphone is an example of the device 160. Displayed are the user's input of instrument pitch provided through 150, the systematic error in tuning that was calculated in 300, the standard musical exercise determined in 460 and a rating for the overall performance. Any method may be used to determine a rating without departing from the scope of the present invention. Those of ordinary skill in the art will be able to attribute importance to the various factors available and determine an appropriate rating. The rating could be dependent upon the usual standard attained by the performer which may be provided through the user input 150 or may be determined from a history of ratings attributed to that performer. It is possible to keep a history of ratings attained by an individual performer if the performer is identified through the user interface 150 or if the device 160 is set up to keep a history of all recent performances. In the example 500 the measured notes performed in the standard musical exercise are displayed along with the intonation error in cents for each associated frequency determined by 310 as calculated using the formula for tuning error given above. Incorrect notes are indicated by enclosing them in { } style of brackets. The extra note that was found in 310 is also displayed. The tempo of each section that was performed contiguously is displayed with an indication, here via a dashed line, of a tempo that includes extra or missing notes. The tempo is calculated as the combined duration of all the notes and silences in the contiguous section divided by the number of notes in that section to give an overall tempo in the standard beats/minute (bpm) unit. This may be adjusted to reflect different values of beats to align with user preference. In the ABRSM standard musical exercises the minimum bpm values for scales are quoted against a crotchet beat while the exercises are expected to be played as quavers with the exception of the final note. Information given on the display should ideally be able to produce a more detailed explanation upon request at least to the level of whether the overall intonation, tempo, etc. was poor, average or good. This could be provided after the user touches the screen near or on a key word or it could be portrayed by colour coding the key words. It is also shown in 500 that there is a play button. This may be offered to the user so that the performance may be heard and the display may highlight the relevant portions as the recorded performance is played. It is preferable that the display is updated if parameters are changed. For instance if the instrument pitch is changed on this display the note values should transpose appropriately. Similarly, if the musical exercise is changed then the display should preferably update with the notes in the performance that are associated with the exercise specified if it is possible to do so.

Figure 6:
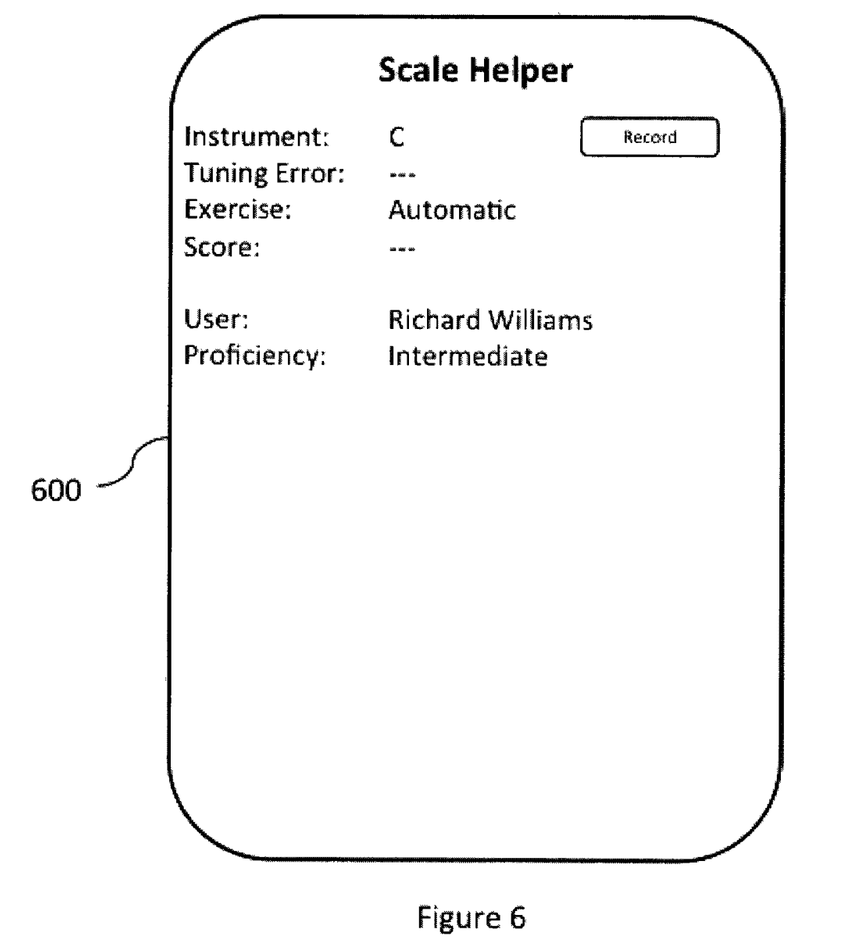
FIG. 6 illustrates an exemplary user input screen.

An illustration of the choices that may be presented to the user for their input 150 is shown in FIG. 6. The illustration 600 is of a screen from a typical Smartphone display where a Smartphone is an example of the device 160. Typical configuration items as mentioned in the description above are shown. The pitch of the instrument, the ability to prescribe a musical exercise and the user's name and proficiency can all be entered or left as shown. There is also a button to start the recording process for the input of the performance. Other items that do not appear in 600 although they have been discussed above include the frequency $F_A$ and the measure of a beat for bpm.

It is understood that there are a large variety of ways to represent the choices available to the user and the feedback given to the user and there is a lot of information that can be extracted from the performance that is meaningful and useful to the performer. The extent of the information and choice available to the user and the manner in which this information is displayed may be altered from the description here without departing from the scope of the present invention.

CONCLUSION

A method for giving feedback on a musical performance has been presented. The musical performance could be performed either using a musical instrument or voice. It is known that feedback on performance is useful and there are several devices available that enable this. The method presented here overcomes the main limitations of previous systems that give feedback where the performer has to follow a prescribed score or perform to a suitable standard or be able to identify the area of the performance that needs improvement.

The present invention uses a performance of a standard musical exercise to evaluate the proficiency of the execution of the musical exercise. The standard musical exercise being performed may be determined automatically as part of the method or it may be given as user input. In either case, the performance of the standard musical exercise is tolerant to repetition and/or omission of notes during the performance; greatly varying tempos during the performance; and systematic tuning errors. All of these imperfections are found in the everyday practice of inexperienced musicians and so the method described here is able to help such performers improve. The same method is also capable of giving feedback to more proficient musicians since it relies on objective measures. It is therefore possible for a musician to continue to use this method to improve their performance throughout their musical advancement. The method is capable of being run in real-time on today's mobile platforms whose portability makes the method convenient to invoke wherever the musical exercise is performed.

It is to be understood that the algorithms and the order of processing steps presented here are meant to be illustrative, and not restrictive. Many other embodiments will be apparent to those of skill in the art upon reviewing the above description. It is also to be understood that the capability of platforms continues to evolve and future platforms will be capable of supporting much more complex algorithms which will enable improved levels of feedback and accuracy to be obtained. The input and output methods of systems are also likely to change over time allowing new methods of transmitting and receiving information. The use of terms such as display, speaker, and touch screen in the description here are meant to be illustrative, and not restrictive. Therefore, it is manifestly intended that this invention be limited only by the following claims and equivalents thereof.

The invention claimed is:

1. A method comprising:
   obtaining, via a computing device, at least one signal associated with an execution of a musical exercise by a performer; and
   providing, via the computing device, objective feedback on the execution of the musical exercise, the objective feedback being based at least in part on an analysis of the at least one signal and without prior knowledge of the musical exercise being performed.

2. The method of claim 1, wherein the objective feedback includes an overall rating of the execution of the musical exercise.

3. The method of claim 2, wherein the objective feedback includes an indication of a systematic tuning error.

4. The of claim 3, wherein the systematic tuning error does not detract from the overall rating of the execution of the musical exercise.

5. The method of claim 3, wherein the systematic tuning error is calculated as an average number of cents between at least two received notes and their associated closest ideal notes such that the number of cents between each received note used in the calculation and the associated closest ideal note is no more than 50 cents from the systematic tuning error.

6. The method of claim 1, wherein the objective feedback includes information on intonation of the execution of the musical exercise.

7. The method of claim 1, wherein the objective feedback includes information on tempo of the execution of the musical exercise.

8. The method of claim 1, wherein the objective feedback includes information on articulation of the execution of the musical exercise.

9. The method of claim 1, wherein the objective feedback is given in the context of previous feedback to show how the execution has changed over time.

10. A method comprising:
    obtaining, via a computing device, at least one signal associated with an execution of a musical exercise by a performer; and
    providing, via the computing device, objective feedback on the execution of the musical exercise based at least in part on an analysis of the at least one signal, the objective feedback being is tolerant to any of: (a) the performer repeating notes during the execution of the musical exercise; (b) the performer omitting notes during the execution of the musical exercise; and (c) the performer including additional notes during the execution of the musical exercise, the additional notes not being included in the musical exercise.

11. The method of claim 10, wherein the objective feedback includes an overall rating of the execution of the musical exercise.

12. The method of claim 11, wherein the objective feedback includes an indication of a systematic tuning error.

13. The method of claim 12, wherein the systematic tuning error does not detract from the overall rating of the execution of the musical exercise.

14. The method of claim 12, wherein the systematic tuning error is calculated as an average number of cents between at least two received notes and their associated closest ideal notes such that the number of cents between each received note used in the calculation and their associated closest ideal note is no more than 50 cents from the systematic tuning error.

15. The method of claim 10, wherein the objective feedback includes information on intonation of the execution of the musical exercise.

16. The method of claim 10, wherein the objective feedback includes information on tempo of the execution of the musical exercise.

17. The method of claim 10, wherein the objective feedback includes information on articulation of the execution of the musical exercise.

18. The method of claim 10, wherein the objective feedback is given in the context of previous feedback to show how the execution has changed over time.

19. A method comprising:
    obtaining, via a computing device, at least one signal associated with an execution of a musical exercise by a performer; and
    providing, via a computing device, objective feedback on the musical exercise based at least in part on an analysis of the at least one signal, wherein the objective feedback is tolerant to the performer of the musical exercise restarting from an earlier point in the musical exercise before completion.

20. The method of claim 19, wherein the objective feedback includes an overall rating of the execution of the musical exercise.

21. The method of claim 20, wherein the objective feedback includes an indication of a systematic tuning error.

22. The method of claim 21, wherein the systematic tuning error does not detract from the overall rating of the performance execution of the musical exercise.

23. The method of claim 21, wherein the systematic tuning error is calculated as an average number of cents between at least two received notes and their associated closest ideal notes such that the number of cents between each received note used in the calculation and their associated closest ideal note is no more than 50 cents from the systematic tuning error.

24. The method of claim 19, wherein the objective feedback includes information on intonation of the execution of the musical exercise.

25. The method of claim 19, wherein the objective feedback includes information on tempo of the execution of the musical exercise.

26. The method of claim 19, wherein the objective feedback includes information on articulation of the execution of the musical exercise.

27. The method of claim 19, wherein the objective feedback is given in the context of previous feedback to show how the execution has changed over time.

28. A method comprising:
    obtaining, via a computing device, at least one signal associated with a musical exercise,
    providing, via the computing device, objective feedback on the musical exercise that is tolerant to a variation in tempo by at least a factor of 2 during an execution of the musical exercise.

29. The method of claim 28, wherein the objective feedback includes an overall rating of the execution of the musical exercise.

30. The method of claim 29, wherein the objective feedback includes an indication of a systematic tuning error.

31. The method of claim 30, wherein the systematic tuning error does not detract from the overall rating of the execution of the musical exercise.

32. The method of claim 30, wherein the systematic tuning error is calculated as an average number of cents between at least two received notes and their associated closest ideal notes such that the number of cents between each received note used in the calculation and their associated closest ideal note is no more than 50 cents from the systematic tuning error.

33. The method of claim 28, wherein the objective feedback includes information on intonation of the execution of the musical exercise.

34. The method of claim 28, wherein the objective feedback includes information on tempo of the execution of the musical exercise.

35. The method of claim 28, wherein the objective feedback includes information on articulation of the execution of the musical exercise.

36. The method of claim 28, wherein the objective feedback is given in the context of previous feedback to show how the execution has changed over time.

* * * * *